United States Patent [19]

Ozawa et al.

[11] 4,405,671
[45] Sep. 20, 1983

[54] OPTICAL INFORMATION RECORDING DISK

[75] Inventors: Hiroshi Ozawa; Masaaki Shin; Akio Fuziwara; Mitsuyoshi Nakamura; Ichiro Otsuka; Kazuo Sugazaki, all of Kanagawa, Japan

[73] Assignee: Mitsui Toatsu Chemicals, Inc., Tokyo, Japan

[21] Appl. No.: 341,010

[22] Filed: Jan. 20, 1982

[30] Foreign Application Priority Data

May 11, 1981 [JP] Japan .................................. 56-69352

[51] Int. Cl.$^3$ ............................................... B32B 3/02
[52] U.S. Cl. ..................................... 428/65; 346/76 L; 346/77 E; 346/135.1; 346/137; 369/275; 369/276; 369/286; 369/288; 428/64; 428/522; 428/523
[58] Field of Search .................... 428/64, 65, 522, 523; 369/275, 276, 288, 286; 346/137, 135.1, 76 L, 77 E

[56] References Cited

U.S. PATENT DOCUMENTS 4,125,654 11/1978 Kaneko .................................. 428/64
4,304,806 12/1981 Anderson ............................... 428/64

*Primary Examiner*—Ellis P. Robinson
*Attorney, Agent, or Firm*—Fisher, Christen & Sabol

[57] ABSTRACT

Disclosed herein is an optical information recording disk comprising as a base material thereof a polymer or copolymer having a glass transition temperature of at least 50° C. and a structural unit derived from a monomer which is an ester of an $\alpha,\beta$-unsaturated carboxylic acid and an alicyclic alcohol represented by the general formula:

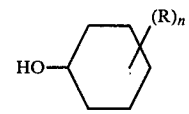

wherein n is an integer of 1–5, R denotes a hydrogen or an alkyl or alkenyl group, and, when n stands for an integer of 2–5, the Rs may be the same or different.

The above disk does not develop deformation such as warping or twisting by changes in humidity and is uniform optically.

11 Claims, No Drawings

OPTICAL INFORMATION RECORDING DISK

BACKGROUND OF THE INVENTION (a) Field of the Invention

This invention relates to an optical information recording disk adapted for use in reading out signals, which have been recorded therein, by means of a laser beam to be reflected by or transmitted through the disk.

(b) Description of the Prior Art

An optical information recording/reproducing system has been proposed and adopted to a certain extent. In accordance with the above system, signals, which have been recorded on a disk by means of minute pits formed therein, are read out by directing a spot beam of a laser beam onto the disk and detecting the intensity of a beam reflected by or transmitted through the disk. A widespread use of the above system for the recording-/reproducing of picture images, voice and sound as well as the storage/reproduction of a great number of pieces of information is expected, since it permits to increase the packing density considerably, the quality of picture images, voice or sound to be reproduced therefrom are excellent in their characteristics, and a great number of copies can be easily produced, for example, using a single stamper.

Needless to say, the recording of information, which makes use of the above principle, is not necessarily limited to such disk-like configurations but may also be effected by means of a plane or curved surface of any desired configuration if necessary; and such are included by the disk of the present invention.

The base material of the disks for use in the above recording/reproducing system are required, of course, to be transparent so as to allow a laser beam to transmit through. They are also required, strongly, to have a high degree of optical uniformity. It has been well-known that, depending on the resin to be used as a base material for disks, the resin may undergo a flow upon molding and molecular orientation in the course of its cooling, whereby causing birefringence to occur. The optical non-uniformity resulting from birefrigence is a fatal defect for optical disks. From such a viewpoint, the base material of optical disks has been limited to certain specific resins. In addition, it is essential that such a base material of optical disks have good moldability so as to replicate minute pits of a stamper. As resinous materials capable of satisfying both the high degree of optical uniformity mentioned above and good moldability, only polymers containing methyl methacrylate as their principal components from a practical standpoint, shall be referred to.

However, optical disks made of conventionally-known polymers or copolymers of methyl methacrylate (their principal components) are accompanied by a fatal drawback that they are susceptible to warping or twisting especially when placed in an environment of high humidity. Improvement of such a drawback has thus been eagerly awaited.

SUMMARY OF THE INVENTION

One object of this invention is to provide an optical information recording disk, which does not cause birefringence, is uniform optically, and does not cause deformation such as warping or twisting even in an environment of high humidity.

Another object of this invention is to provide a polymer or copolymer for optical information recording disks excellent in both moldability and optical and mechanical properties.

These objects of this invention can be achieved by an optical information recording disk comprising as a base material thereof a polymer or copolymer having a glass transition temperature of at least 50° C. and a structural unit derived from a monomer (A) which is an ester of an α,β-unsaturated carboxylic acid and an alicyclic alcohol represented by the general formula:

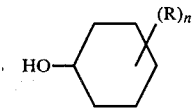

wherein n is an integer of 1–5, R denotes a hydrogen of an alkyl or alkenyl group, and, when n stands for an integer of 2–5, the Rs may be the same or different.

DETAILED DESCRIPTION OF THE PREFERRED EMBODIMENTS

As a representative exemplary α,β-unsaturated carboxylic acid which may be used as a raw material for the monomer (A) in the present invention, may be mentioned a mono-basic or di-basic α,β-unsaturated carboxylic acid or its anhydride such as acrylic acid, methacrylic acid, crotonic acid, fumaric acid, maleic acid, maleic anhydride, itaconic acid or the like.

On the other hand, as a representative exemplary alicyclic alcohol which is the other raw material for the monomer (A) in the present invention and is represented by the above general formula, may also be mentioned cyclohexanol, 2-methyl cyclohexanol, 3-methyl cyclohexanol, 4-methyl cyclohexanol, 2,4-dimethyl cyclohexanol, 4-isopropyl cyclohexanol, 4-isopropenyl cyclohexanol, menthol or the like.

Any mono- or di-ester derived from the reaction of the above-mentioned α,β-unsaturated carboxylic acid and alicyclic alcohol may be used as the monomer (A) in the present invention. Among such esters, cyclohexyl acrylate and, particularly, cyclohexyl methacrylate are preferred in that they provide hard disks.

The above-described monomer (A) may be produced, for example, through an ester exchange reaction between an alkyl ester of the above-mentioned α,β-unsaturated carboxylic acid and alicyclic alcohol.

The polymer or copolymer used in this invention contains as a structural unit thereof at least one kind of the above-described monomer (A), including the homopolymer of the monomer (A), copolymers of two or more kinds of the monomer (A), and copolymers of at least one kind of the monomer (A) and at least one kind of other monomers.

As the above-described other monomers usable in the present invention, it is possible to use any monomers which can be copolymerized with the above monomer (A). As representative examples, may be mentioned for example methacrylates and acryaltes such as methyl methacrylate, ethyl methacrylate, isopropyl methacrylate, butyl methacrylate, isobutyl methacrylate, 2-ethylhexyl methacrylate, lauryl methacrylate, stearyl methacrylate, hydroxyethyl methacrylate, hydroxypropyl methacrylate, methyl acrylate, ethyl acrylate, isopropyl acrylate, butyl acrylate, isobutyl acrylate, 2-ethylhexyl acrylate, lauryl acrylate and stearyl acrylate; dicarboxylic acid diesters such as dimethyl fumarate, dibutyl fumarate, dimethyl maleate, dibutyl maleate, dimethyl itaconate, and dibutyl itaconate; vinyl esters such as vinyl acetate, and vinyl propionate; vinyl ethers such as vinyl methyl ether, vinyl ethyl ether and vinyl isobutyl ether; aromatic monomers such as styrene, o-methylstyrene, m-methylstyrene, p-methylstyrene, α-methylstyrene and p-chlorostyrene; halogenated monomers including chlorine-containing monomers such as vinyl chloride and vinylidene chloride; and nitrogen-containing monomers such as acrylonitrile and methacrylonitrile. They may be incorporated in a range that the above-described objects of this invention are not hampered.

The above monomer (A) may be contained in the polymer or copolymer used in the present invention in an amount of 10–100%, preferably 20–100%, and most preferably 25–90% by weight. When present in any amounts less than 10% by weight, the warping and twisting problems under highly humid environmental conditions may not be improved to a sufficient extent.

It is essential that the polymer or copolymer used in the present invention have a glass transition temperature of at least 50° C., preferably at least 70° C., and most preferably in the range of 75°–120° C. If the glass transition temperature is lower than 50° C., the resulting optical disks are liable to deformation such as warping and twisting by heat, thereby making such a polymer or copolymer unsuitable for the present invention. On the other hand, if it exceeds 120° C., difficulties may be encountered upon molding the polymer or copolymer into disks. Accordingly, it is necessary to carefully choose the kind and amount of each monomer to be used for copolymerization with the monomer (A) so that the resulting copolymer will meet the above-described glass transition temperature. The term "glass transition temperature" as used herein means a value determined in accordance with the differential thermal analysis.

Among the above-mentioned monomers of a type different from the monomer (A), unsaturated carboxylic acid esters free of any aromatic rings are particularly preferred as they can afford copolymers which do not develop birefringence. When one or more monomers other than such unsaturated carboxylic acid esters are used as copolymerization components, it is preferable to limit their weight ratio to 30% at most.

To maintain good replicatability of pits upon molding and to avoid damages of pits or disk in the course of molding, it is desirous that the polymer or copolymer used in the present invention and having the monomer (A) as its structural unit have a melt flow value (determined under ASTMD-1238, at 230° C. and under a load of 3800 g) of 1–50, preferably 5–30.

The above polymer or copolymer used in the present invention may be prepared in accordance with any one of conventionally known polymerization methods such as, for example, bulk polymerization, suspension polymerization, solution polymerization and emulsion polymerization and combination of more than one of them.

Furthermore, as additional components of the base material of the present invention, it is possible to use together with the above polymer or copolymer the following additives, for example, in such a range that they will not deleteriously affect the achievement of the objects of this invention:

Silicone, wax, fatty acid, fatty acid ester, metal salt of fatty acid, aliphatic alcohol, etc, for improving the releasability of the polymer or copolymer from the stamper; and Sulfonic acid salt of higher alcohol, tertiary ammonium salt, etc, for the prevention of accumulation of electrostatic charge.

For the manufacture of the optical disk of the present invention, its base material may be molded by repricating pits, which serve as recorded signals, onto the polymer or copolymer in a mold equipped with a stamper in accordance with a conventionally known method such as injection molding or press forming. In addition, in the case of reproduced disks, a reflector layer may generally be formed on the surface bearing pits repricated thereto in accordance with a method such as vacuum plating, spattering or ion plating of a metal. A protective coating may also be applied on the reflector layer if necessary. On the other hand, in the case of optical memory disks, they may be produced, subsequent to repricating pits which serve as tracking signals onto a base material, by applying through vacuum plating or conventional coating onto the pit-bearing surface thereof a recording layer which is made of an amorphous rare metal or a compound capable of thermally decomposing by laser and where a user can write in the necessary information, and, if required, forming a reflector layer and/or protective coating thereon as described above.

The optical disk of the present invention produced in accordance with a method as mentioned above is free of birefringence, is optically uniform and does not develop problems such as warping and twisting even wnen placed in an environment of high humidity, thereby leading to a great improvement to the drawbacks of conventional optical disks.

The invention will now be described more specifically with a reference to the following examples and comparative examples, in which all numerical values are expressed in terms of parts by weight unless otherwise specified.

EXAMPLES 1–5 AND COMPARATIVE EXAMPLES 1–2

(Preparation of polymer or copolymer)

Each mixed solution of the raw materials of monomers, polymerization initiators, chain transfer agents and release agents in the amounts shown in Table 1 was poured into a polymerization cell made of tempered glass (wall thickness: 5 mm) and the cell was then sealed with a gasket at the top thereof. It was then immersed for 6 hours in warm water of 80° C., followed by a further heating of 2 hours in a hot-air drier of 125° C. Thereafter, it was cooled and opened, thereby giving the copolymer of each of the Examples. The glass transition temperature, melt flow value and the total content of volatile components of each copolymer were measured. The measurement results are also shown in Table 1.

(Production of disks)

Pellets of each copolymer prepared above were comminuted to a size capable of passing through a sieve of 40 mesh. They were then injection molded in a mold equipped with a stamper by using an injection molding machine with a barrel temperature of 200° C., thereby providing a disk of 1.2 mm in thickness and 120 mm in diameter. Thereafter, a reflector layer of aluminum was formed by the spattering method on a surface in which signal pits had been engraved. Then, acrylic lacquer was coated as a protective coating on the reflector layer and dried. In this manner, the optical information recording disks of Examples 1-5 and Comparative Examples 1-2 were produced.

(Evaluation of characteristics of disks)

In the course of the production of each disk by the above-described method, each transparent disk plate was sandwiched between two polarizing plates prior to forming the reflector layer. It was then exposed to visible light and the resulting interference fringes were observed to determine whether any birefringence was developed.

Furthermore, each disk produced in accordance with the above method and having reflecting and protective coating layers was allowed to stand for 48 hours in a box maintained at 50° C. and a relative humidity of 95%. It was then taken out of the box and its water absorption was immediately determined by measuring its weight increase. Subsequently, it was placed for 60 minutes in an environment of 30° C. and a relative humidity of 50% to determine whether it would develop any warping or twisting. Results of these measurements and tests are summarized in Table 2.

TABLE 1

| Raw material and characteristic value | Example 1 | Example 2 | Example 3 | Example 4 | Example 5 | Com. Example 1 | Com. Example 2 |
|---|---|---|---|---|---|---|---|
| Cyclohexyl methacrylate | 90 | 50 | — | 10 | 30 | — | — |
| 4-Isopropylcyclohexyl acrylate | — | — | 30 | — | — | — | — |
| Dicyclohexyl fumarate | — | — | — | 20 | — | — | — |
| Methyl methacrylate | — | 45 | 50 | 50 | 45 | 90 | 45 |
| Isobutyl methacrylate | — | — | — | 20 | — | — | — |
| Ethyl acrylate | 10 | 5 | — | — | 5 | 10 | 5 |
| Styrene | — | — | 5 | — | 20 | — | 50 |
| Methacrylonitrile | — | — | 5 | — | — | — | — |
| Azo-bis-isobutylonitrile | 0.2 | 0.2 | — | 0.2 | — | 0.2 | — |
| Benzoyl peroxide | — | — | 1.0 | — | 1.0 | — | 1.0 |
| Tert.-butyl peroxybenzoate | 0.1 | 0.1 | 0.1 | 0.1 | 0.1 | 0.1 | 0.1 |
| n-Dodecyl mercaptan | 0.3 | 0.3 | — | 0.3 | — | 0.3 | — |
| Glass transition temperature (°C.)[1] | 89 | 94 | 86 | 90 | 94 | 91 | 95 |
| Melt flow value[2] | 15 | 12 | 18 | 21 | 15 | 18 | 12 |
| Total content of volatile components[3] (%) | 0.2 | 0.3 | 0.4 | 0.3 | 0.2 | 0.3 | 0.3 |

Remarks:
[1]Determined in accordance with the DSC method.
[2]Measured in accordance with ASTM D-1238 (230° C.; load: 3800 g).
[3]Determined by placing 1 g of each resin in an aluminum petri dish, heating it at 150° C. for 1 hour and measuring its weight loss.

unsaturated carboxylic acid and an alicyclic alcohol represented by the general formula:

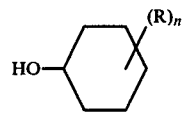

wherein n is an integer of 1-5, R denotes a hydrogen or an alkyl or alkenyl group, and, when n stands for an integer of 2-5, the Rs may be the same or different.

2. The disk as claimed in claim 1, wherein the $\alpha,\beta$-unsaturated carboxylic acid is acrylic, methacrylic, crotonic, maleic, fumaric or itaconic acid.

3. The disk as claimed in claim 1 or 2, wherein the alicyclic alcohol is cyclohexanol, 2-methyl cyclohexanol, 3-methyl cyclohexanol, 4-methyl cyclohexanol, 2,4-dimethyl cyclohexanol, 4-isopropyl cyclohexanol, 4-isopropenyl cyclohexanol or menthol.

4. The disk as claimed in claim 1, wherein the monomer (A) is cyclohexyl acrylate or cyclohexyl methacrylate.

5. The disk as claimed in claim 1, wherein the structural unit derived from the monomer (A) amounts to 20-100% by weight of the polymer or copolymer.

6. The disk as claimed in claim 5, wherein the structural unit derived from the monomer (A) amounts to 25-90% by weight of the polymer or copolymer.

7. The disk as claimed in any one of claim 1, 2, 3, 4, 5, or 6 wherein the base material is a copolymer of the monomer (A) and one or more compounds selected from the group consisting of methacrylates, acrylates, fumarates, maleates, itaconates, vinyl alcohol esters, vinyl alcohol ethers, aromatic monomers, halogenated monomers such as vinyl chloride and vinylidene chloride, and nitrogen-containing monomers such as acrylonitrile and methacrylonitrile.

8. The disk as claimed in claim 1, wherein the polymer or copolymer has a glass transition temperature of at least 70° C.

9. The disk as claimed in claim 1, wherein the polymer or copolymer has a glass transition temperature in the range of 75°-120° C.

10. The disk as claimed in claim 1, wherein said melt index of the polymer or copolymer ranges from 5 to 30.

11. The disk as claimed in claim 3, wherein the base

TABLE 2

| Evaluated item | Example 1 | Example 2 | Example 3 | Example 4 | Example 5 | Comparative Example 1 | Comparative Example 2 |
|---|---|---|---|---|---|---|---|
| Birefringence (interference fringes) | not observed | not observed | not observed | not observed | not observed | not observed | interference fringes clearly observed |
| Water absorption (%) | 0.4 | 0.6 | 0.6 | 0.7 | 0.5 | 1.6 | 0.5 |
| Warping and/or twisting | not observed | not observed | not observed | not observed | not observed | warping/twisting developed | not observed |

What is claimed is:

1. An optical information recording disk comprising as a base material thereof a polymer or copolymer having a glass transition temperature of at least 50° C., a melt index determined in accordance with ASTM-D1238 at 230° C. and under a 3800 g load condition in the range of from 1 to 50, and having from 10 to 100% by weight of a structural unit derived from a monomer (A) based on the total amount of said polymer or copolymer, said monomer (A) being an ester of an $\alpha,\beta$- material is a copolymer of the monomer (A) and one or more compounds selected from the group consisting of methacrylates, acrylates, fumarates, maleates, itaconates, vinyl alcohol esters, vinyl alcohol ethers, aromatic monomers, halogenated monomers such as vinyl chloride and vinylidene chloride, and nitrogen-containing monomers such as acrylonitrile and methacrylonitrile.

* * * * *